Sept. 17, 1929.   R. D. MERSHON   1,728,691
ELECTROLYTIC RECTIFIER
Filed Oct. 21, 1919
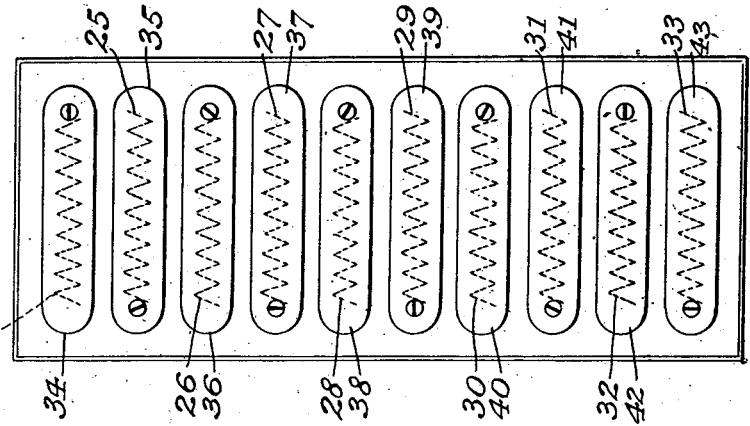
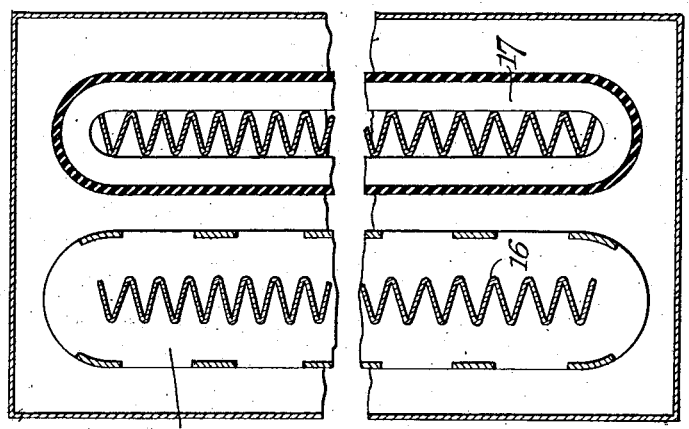
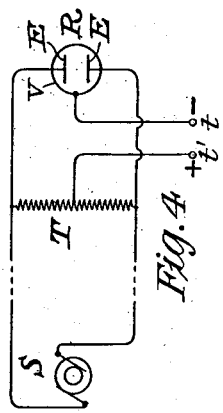
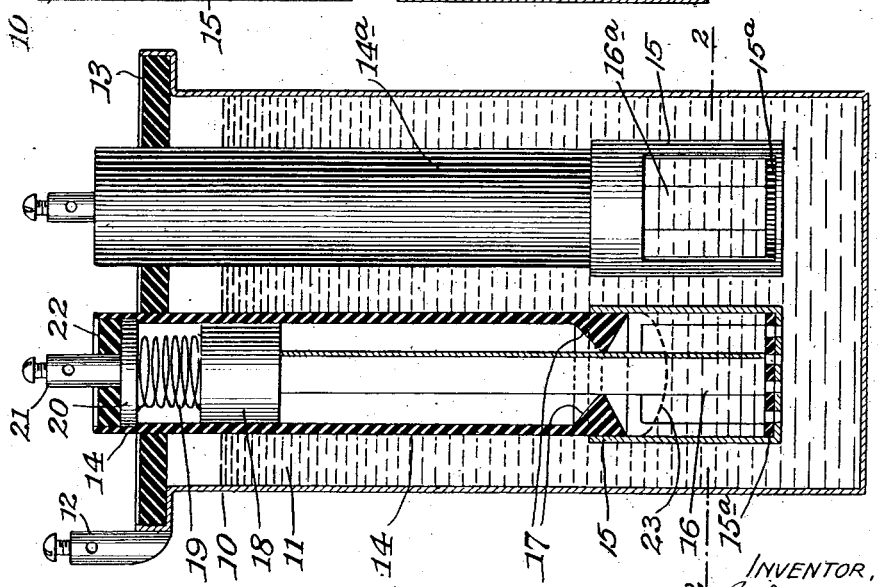
INVENTOR,
R. D. Mershon
BY Kerr, Page, Cooper & Hayward
Attorneys.

Patented Sept. 17, 1929

1,728,691

UNITED STATES PATENT OFFICE

RALPH D. MERSHON, OF NEW YORK, N. Y.

ELECTROLYTIC RECTIFIER

Application filed October 21, 1919. Serial No. 332,289.

This invention relates to electrolytic devices, known as electrolytic rectifiers, for rectifying alternating electric current, and consisting, in general, of electrodes composed of aluminum or other suitable metal and an electrolyte, in which the electrodes are immersed, consisting of a solution of sodium phosphate or other suitable compound. Such rectifiers suffer from the disadvantage that the film-coated electrodes waste away, thereby limiting the life of the apparatus. My present invention is designed to overcome this difficulty, and accordingly its chief object is to provide a rectifier in which the filming electrodes will be automatically renewed as they waste away. To this and other ends the invention consists in the novel features of construction and combinations of elements hereinafter described.

Convenient and effective embodiments of the invention are illustrated in the accompanying drawing, in which Fig. 1 is a cross section of a rectifier for rectifying both halves of the current wave, showing one of the electrode chambers in section and another in elevation.

Fig. 2 is a section on line 2—2 of Fig. 1.

Fig 3 is a plan view of a rectifier having a larger number of electrodes, to insure greater uniformity in the amount of current passed.

Fig. 4 is a diagram showing how a full-wave rectifier may be connected with a source of alternating current.

The vessel 10, which contains the electrolyte 11, is preferably of non-filming metal, for example iron or lead, so as to serve as the non-filming electrode of the rectifier, and for that purpose may be provided with a binding post or terminal 12. The vessel or container 10 is closed by a lid 13, through which a magazine or chamber 14 extends into the electrolyte, the magazine being preferably made of insulating material. At the open bottom of the magazine is a cage or basket 15, which may be of insulating material, or of iron, lead, aluminum, or other metal which will not impair the operation of the rectifier. This cage or basket serves to support the filmed electrode 16, which latter may be of any suitable form, as for example, a corrugated or crimped plate, as shown better in Fig. 2. If the basket is of metal it should have a layer of insulation or its equivalent 15ª for the electrode to rest on. The insulating layer and the bottom of the basket are preferably pierced with holes, to facilitate circulation of the electrolyte. The lower edges of the magazine 14 are preferably thickened and tapered inwardly, as at 17, to serve as guides and thereby position the electrode centrally in the magazine and in the cage or basket. The top of the electrode carries a plunger or weight 18 of metal (iron, lead, or other suitable material) fitting the magazine loosely and connected by a pliable helically coiled wire 19 to a conducting disk 20 carrying a binding post 21 and seated in the top of the magazine. The disk or closure is preferably sealed in place (air-tight) by a layer 22 of pitch, paraffin, sealing wax or other suitable material.

When the magazine containing the electrode is thrust into the electrolyte the air in the magazine prevents the electrolyte rising in the magazine, and hence only the lower portion of the electrode is in contact with the electrolyte. Then when the rectifier is passing current, only the lower part of the electrode is attacked and caused to waste away. As the corrosion is fastest at the bottom of the electrode the lower edge eventually crumbles or is entirely consumed, allowing the plunger or weight to push the electrode down in the magazine, thereby maintaining approximately constant in area the exposed surface of the electrode by exposing fresh surface to the electrolyte at the bottom of the magazine. This operation is repeated from time to time, until eventually the entire electrode is consumed and must be renewed.

The corrosion of the bottom of the electrode at a faster rate than at the upper part of the exposed portion of the electrode is an advantageous feature, as it causes the electrode to be fed downward by shorter steps. Moreover, this action is facilitated in my apparatus by reason of the gas liberated by the electrolytic process. This gas, liberated at the surface of the electrode, rises and adds itself to the air in the magazine (replacing any air that may have leaked out), and accumulates therein, depressing the surface of the electrolyte around the electrode at the bottom of the magazine and forming a bubble, as indicated by the dotted line 23. Eventually the bubble breaks, some of the gas escaping through the openings in the sides of the basket, and the electrolyte rises around the electrode; then the gas begins to accumulate in the magazine again, and so on. The electrolyte thus rises and falls, alternately covering and leaving bare the upper part of the exposed portion of the electrode, so that on the whole this upper part passes less current than does the lower part, thus insuring that the lower part wastes away the faster. The agitation produced in the electrolyte by the periodic escape of gas as just described is advantageous in that it facilitates detachment of bubbles formed upon and adhering to the sides of the electrodes and induces a more rapid circulation of the electrolyte as a whole.

If the rectifier is to pass both halves of the alternating current wave at least two filmed electrodes must be provided, as in Figs. 1 and 2, where the second electrode is designated by 16ª, in a magazine 14ª.

Any number of electrodes may be used, and in general the more electrodes there are the less variation will there be in the total amount of electrode surface exposed to the electrolyte. This follows from the fact that seldom if ever will two or more feed down at the same instant. The total exposed surface being large relative to the change produced therein by the feeding of one electrode the actual total surface exposed will at no time be greatly different from the average. In Fig. 3 is shown a rectifier (in plan view) employing ten filming electrodes, indicated by dotted lines at 24, 25, 26, . . . . 32, 33, in magazines 34, 35, 36, . . . . 42, 43. If all these electrodes are connected to a common terminal the apparatus will rectify only one half of the current wave, but by connecting them in two sets, for example 24—26—28—30—32 and 25—27—29—31—33, both halves of the wave can be rectified.

A convenient method of connecting the rectifier to a source of alternating current is illustrated in Fig. 4, in which T designates, generally, a transformer of any suitable type, connected with a source S. In the rectifier R, the two filming electrodes (or two sets of such electrodes) connected to the two terminals of the transformer, are represented by E, E, and the vessel V, of non-filming metal, is the non-filming electrode. From the latter, and from the neutral point of the transformer, taps or leads $t, t'$ are brought out. Inasmuch as the films with which the filmed electrodes are covered permit current to flow readily from the electrolyte to the electrode but strongly oppose the flow of current in the opposite direction, it will be seen that when alternating current is supplied from the source S there will be a unidirectional potential across the leads $t, t'$ as indicated by the signs.

It is to be understood that the invention is not limited to the apparatus herein specifically illustrated and described, but can be embodied in other forms without departure from its spirit.

I claim:

1. In an electrolytic rectifier, a transversely elongated upright magazine having its lower end open and its upper end closed, an electrode consisting of a crimped plate of filming metal positioned in the magazine and freely movable downwardly therein to expose its lower portion to the electrolyte, and a support below the bottom of the electrode to limit the downward movement thereof as it wastes away and thereby maintain the exposed portion of the electrode substantially constant in extent.

2. In an electrolytic rectifier, an electrode comprising an electrolyte container of non-filming metal, an electrolyte therein, a transversely elongated upright magazine having its lower end open and its upper end closed, an electrode consisting of a crimped plate of filming metal positioned in the magazine and freely movable downwardly therein to expose its lower portion to the electrolyte, and a support below the bottom of the electrode to limit the downward movement thereof as it wastes away and thereby maintain the exposed portion of the electrode substantially constant in extent.

3. In an electrolytic rectifier, the combination of an electrolyte, a filming electrode movable for immersion in said electrolyte, and means for simultaneously causing a predetermined portion of said electrode to be exposed to said electrolyte as said electrode wastes away by corrosion in the electrolyte and retarding said corrosion over that part of the said predetermined portion of the electrode adjacent to the remaining unimmersed portion of the electrode.

4. In an electrolytic rectifier, the combination of an electrolyte, a filming electrode movable downwardly to expose its lower portion to the electrolyte, means for automatically advancing the said electrode downwardly by stages as it wears away by corrosion in the said electrolyte, and means cooperating with the said advancing means for retarding the said corrosion on the upper part of the said exposed portion of the electrode, thereby causing the latter to advance downwardly by shorter stages, comprising a magazine closely surrounding the electrode over its unexposed portion, said magazine being sealed air-tight at its upper end and open at its lower end below the surface of the electrolyte, whereby gas produced by the said corrosion of the electrode fills the said chamber and causes the electrolyte to rise and fall successively about the electrode as excess gas periodically releases itself from the lower end of the said magazine.

5. In an electrolytic rectifier, the combination of a transversely elongated upright magazine substantially air-tight and having an opening in its bottom, a cage or basket depending from the bottom of the magazine, an electrode consisting of a transversely elongated crimped plate of filming metal, said electrode resting on the bottom of the cage or basket and extending upwardly into the magazine, and means for urging the electrode downwardly.

6. In an electrolytic rectifier, the combination of a transversely elongated upright magazine having impervious walls to protect its contents from contact with the electrolyte, a movable electrode in the magazine consisting of a transversely elongated plate of filming metal extending out of the magazine into contact with the electrolyte, and means to permit automatic movement of the electrode out of the magazine as the latter wastes away.

7. In an electrolytic rectifier, the combination of an electrode comprising an electrolyte container of non-filming metal, an electrolyte therein, a transversely elongated upright magazine filled with gas and substantially wholly immersed in the said electrolyte, an electrode consisting of a crimped plate of filming metal positioned in the magazine and having one end projecting below the magazine and exposed to the electrolyte, and means to cause automatic movement of the electrode out of the magazine as the former wastes away.

In testimony whereof I affix my signature.

RALPH D. MERSHON.